ENCODING APPARATUS

Filed Dec. 27, 1955 4 Sheets-Sheet 1

BLOCKS 15, 25, 33, 50, 71, 82, 97 AND 111 ARE ADJUSTABLE TRANSPOSITION MECHANISMS.

JACK E. BRIDGES
*INVENTOR.*
BY John J. Pederson
HIS ATTORNEY.

Sept. 8, 1959 J. E. BRIDGES 2,903,686

ENCODING APPARATUS

Filed Dec. 27, 1955 4 Sheets-Sheet 3

JACK E. BRIDGES
*INVENTOR.*

BY John J. Pederson

HIS ATTORNEY.

Sept. 8, 1959 J. E. BRIDGES 2,903,686

ENCODING APPARATUS

Filed Dec. 27, 1955 4 Sheets-Sheet 4

JACK E. BRIDGES
*INVENTOR.*

*BY* John J. Pederson

HIS ATTORNEY.

United States Patent Office 2,903,686

Patented Sept. 8, 1959

2,903,686

ENCODING APPARATUS

Jack E. Bridges, Fort Wayne, Ind., assignor to Zenith Radio Corporation, a corporation of Delaware Application December 27, 1955, Serial No. 555,541

15 Claims. (Cl. 340—347)

This invention relates to an encoding apparatus for use in a subscription television system, that is, a system in which a television signal is transmitted in coded form to be utilized only in subscriber receivers having appropriate decoding equipment actuated in accordance with the coding schedule employed at the transmitter. Apparatus embodying the invention may be included in either the transmitter or receiver and thus the term "encoding" has been employed in its generic sense to encompass either coding or decoding.

Subscription television systems have been proposed wherein the program signal is coded in accordance with a selected coding schedule at the transmitter, and wherein a key or coding signal indicative of the coding schedule is transmitted to subscriber receivers as a modulation component of the television signal itself or over any other air channel. Systems of this general type are disclosed and claimed, for example, in the following copending applications; Serial No. 310,309, filed September 18, 1952, in the name of Alexander Ellett; Serial No. 326,107, filed December 15, 1952, which issued as U.S. Patent No. 2,823,252 on February 11, 1958, in the name of Jack E. Bridges; and Serial No. 370,174, filed July 24, 1953, in the name of Walter S. Druz, all of which are assigned to the present assignee.

Of course, to preclude unauthorized reception the airborne coding signal is not a direct manifestation of the coding schedule; the coding signal is itself coded and requires reading or interpretation before it can be used for decoding. In the arrangements of each of the aforementioned applications, the reading or interpretation of the air code signal may be achieved with an adjustable encoding apparatus which variously interconnects a series of input circuits to a series of output circuits and consequently determines the response of the decoding circuits to the received coding signal. Since the input circuits may be connected to the output circuits in accordance with any selected one of a relatively large number of permutation or transposition patterns, the system is quite secure in that decoding or unscrambling is impossible unless the precise permutation pattern is known.

More particularly, in the Druz application, Serial No. 370,174, for example, a combination of code signal bursts, individually having a predetermined identifying frequency, is transmitted to subscriber receivers along with the composite video signal during each field-retrace interval. These bursts, which are randomly sequenced and randomly appearing within each combination, are rectified and segregated from one another at the receiver by means of suitable filters for application over assigned input circuits of an encoding or switching apparatus. The apparatus may employ a family of toggle switches and selectively establishes a multiplicity of circuit connections between these input circuits and a plurality of output circuits which lead to various input terminals of a multi-stable actuating device, such as a pair of series connected bi-stable multivibrators. With this arrangement, the code signal bursts are separated from one another on a frequency basis and corresponding actuating pulses are applied to the multi-stable actuating device to operate that device between its several stable operating conditions in a prescribed sequence determined, at least in part, by the adjustment of the encoding apparatus. As explained in the Druz application, the relative timing of the video and synchronizing components of the received subscription television signal may be varied with at least some of the variations in operating condition of the actuating device so that the operating mode of the receiver is changed in time synchronism, but in a complementary sense, to corresponding mode changes made at the transmitter, in order to effect decoding.

The present invention is concerned with an improved adjustable encoding apparatus that may be used in subscription television systems such as those described and claimed in the aforementioned applications.

It is, accordingly, an object of the present invention to provide an improved and simplified encoding or switching apparatus for connecting a series of input circuits to a series of output circuits in accordance with a selected one of a plurality of different permutation or transposition patterns.

It is another object of the invention to provide an encoding apparatus which may be used in a subscription television system and which, when so used, enhances the secrecy aspects of that system.

It is a further object of the invention to provide a new and improved encoding apparatus which may be produced economically on a large scale with mass production techniques, and yet may be simply and conveniently adapted to provide a relationship between its adjustments and the resulting permutations of input to output circuits which is unique and different than that of any other similar apparatus, so that each subscriber in a particular geographical receiving area may be provided with an encoding apparatus which bears no constant or readily ascertainable relationship to those of the other subscribers in the same area.

An encoding apparatus for a subscription television system, constructed in accordance with the invention, includes a series of N input circuits and a series of M output circuits, where N and M are either similar or different integers. The encoding apparatus further comprises a plurality of devices which individually represent a unique permutation pattern; these devices are preferably of similar construction but individually provided with a predetermined characteristic different from that of each of the remaining devices. For example, these devices may take the form of matrix devices which individually have a series of N input terminals connected to a series of M output terminals in accordance with a unique input-output permutation pattern. Finally, the encoding apparatus comprises means for selecting any desired one of the devices and for utilizing the selected device to intercouple the input circuits with the output circuits in accordance with the permutation pattern represented by the selected device. In an arrangement wherein matrix devices are employed, this selecting means may comprise switching means having a plurality of operating conditions for selectively coupling the input circuits, through a different one of the matrix devices for each of the operating conditions, to the output circuits in accordance with the permutation pattern of the selected matrix device.

The features of this invention which are believed to be new are set forth with particularity in the appended claims. The invention, together with further objects and advantages thereof, may best be understood, however, by reference to the following description in conjunction with the accompanying drawings, in which:

Figure 1:
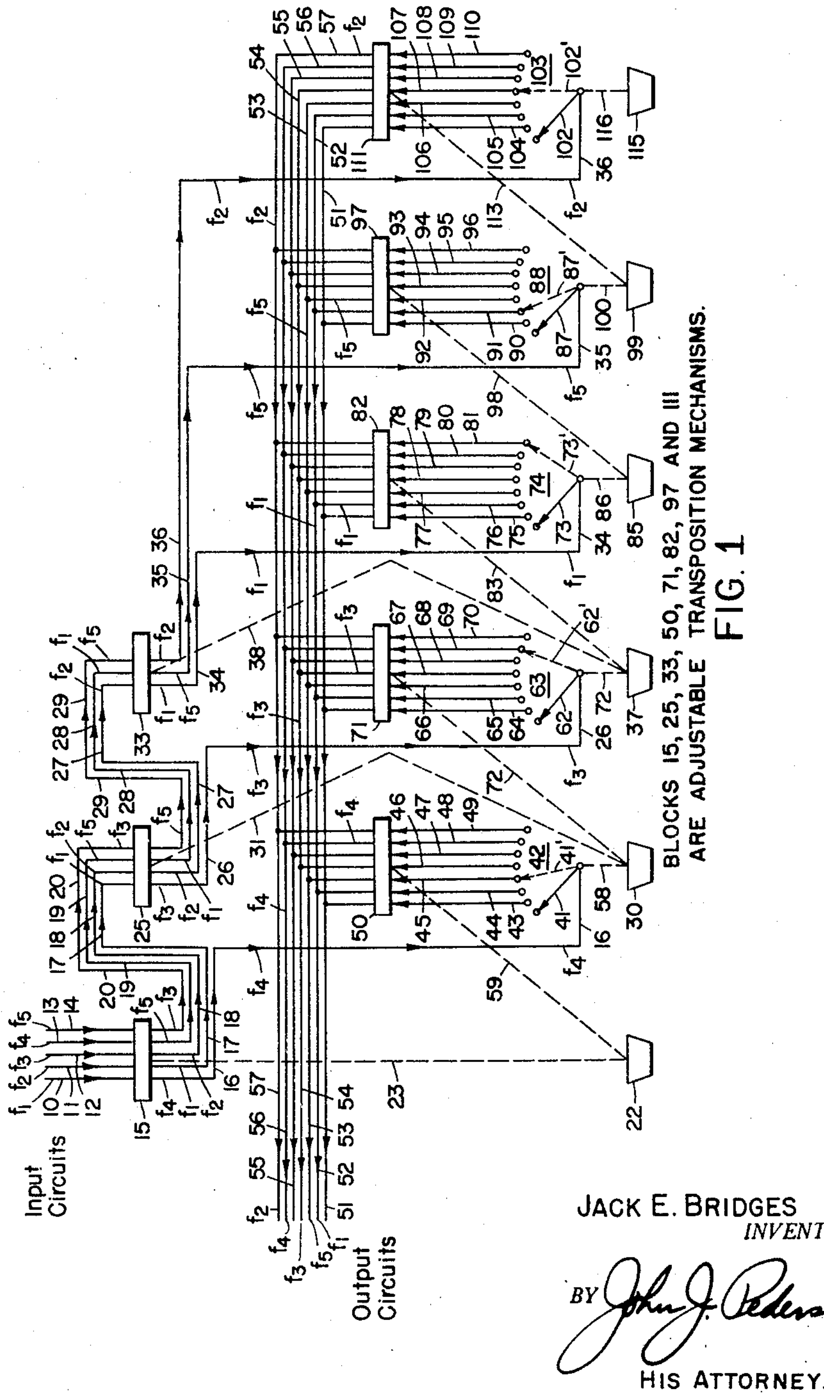
Figure 1 is a schematic diagram of an encoding apparatus constructed in accordance with one embodiment of the invention.

Referring now to Figure 1, a series of five input circuits 10—14 are connected to an adjustable transposition mechanism 15. This mechanism has a plurality of operating positions and connects input circuits 10–14 to a series of five conductors 16–20 in accordance with a different transposition or permutation pattern for each operating position. As will be explained in connection with the discussion of Figure 2, mechanism 15 contains a plurality of matrix devices individually having a series of input terminals connected to a series of a corresponding number of output terminals in accordance with a unique input-output permutation pattern. Positioning of mechanism 15 is controlled by a knob 22 as shown schematically by a dashed construction line 23. Knob 22 may be adjusted by the subscriber to a plurality of different operating positions for selectively coupling input circuit 10–14 through a different one of the matrix devices for each of the positions to output circuits 16–20 in accordance with the permutation pattern of the selected matrix device.

Conductors 17–20 are connected to another adjustable transposition mechanism 25 which is similar to unit 15. In like manner, mechanism 25 contains a plurality of matrix devices for connecting the four conductors 17–20 to a series of four output circuits 26–29 in accordance with the permutation pattern of the selected matrix. The positioning of mechanism 25 is controlled by a manually operated knob 30 as shown by dashed construction line 31. Conductors 27–29 are connected to another adjustable transposition mechanism 33 which, as in the case of units 15 and 25, connects the three circuits 27–29 to a series of three output circuits 34–36 in accordance with the transposition pattern of a selected matrix device in unit 33. The positioning of mechanism 33 is controlled by a manually operated knob 37 as shown by dashed construction line 38.

Output circuit 16 from transposition mechanism 15 is connected to the movable contact 41 of a conventional multiposition rotary switch 42. Contact 41 is shown in its "home" or reference position in solid line construction whereas it is illustrated in one of its active operating positions in dashed line construction. Switch 42 has a series of seven stationary contacts individually connected over an assigned one of a coresponding series of seven conductors 43–49 connected in turn to an adjustable transposition mechanism 50. As in the case of mechanisms 15, 25 and 33, unit 50 likewise comprises a series of matrix devices each of which introduces a unique interconnection pattern of circuits 43–49 to a series of seven output circuits 51–57. The positioning of switch 42 is controlled by knob 30 as shown by the dashed construction line 58 and mechanism 50 is positioned by knob 22, as shown by dashed line 59, in unison with the adjustment of mechanism 15.

Output conductor 26 from transposition mechanism 25 is connected to the movable contact 62 of a multi-position rotary switch 63 which has a series of seven stationary contacts respectively connected to a corresponding series of seven input circuits 64–70 which in turn are connected to another transposition mechanism 71. Mechanism 71 is controlled by knob 30, as shown by dashed construction line 72, simultaneously with the adjustment of switch 42 and mechanism 25, and similarly establishes a variety of interconnection patterns between input circuits 64–70 and output circuits 51–57. Switch 63 is adjusted by means of knob 37 as shown by dashed line 72.

Output conductor 34 from mechanism 33 is connected to the movable contact 73 of a multi-position rotary switch 74 which has a series of seven stationary contacts individually connected over a corresponding series of seven input conductors 75–81 to an adjustable transposition mechanism 82. This mechanism is controlled by knob 37, along with switch 63 and unit 33, as shown by dashed line 83, and connects circuits 75–81 to output circuits 51–57 in accordance with the permutation pattern of the matrix device in mechanism 82 selected by the operation of knob 37. The movable contact of switch 74 is adjusted by a manually operated knob 85 as shown by dashed construction line 86.

Output conductor 35 from mechanism 33 is connected to the movable contact 87 of a multi-position rotary switch 88. As in the case of switches 42, 63 and 74, switch 88 has a series of seven stationary contacts connected over respective ones of a corresponding series of seven input conductors 90–96 to another adjustable transposition mechanism 97 which similarly establishes a selected interconnection pattern between these input circuits and output circuits 51–57. The positioning of mechanism 97 is controlled by knob 85, as is switch 74, as schematically illustrated by dashed construction line 98, and the positioning of switch 88 is achieved by a manually operated knob 99 as shown by dashed line 100. The last output conductor from mechanism 33, namely conductor 36, is connected to the movable contact 102 of a multi-position switch 103 having a series of seven stationary contacts individually connected over a corresponding series of seven input circuits 104–110 to still another adjustable transposition mechanism 111. As in the case of all the other transposition mechanisms, unit 111 contains a plurality of matrix devices and connects these input circuits to output circuits 51–57 according to the pattern of a selected one of the matrix devices. This selection is under the control of knob 99 as shown by dashed line 113. Movable contact 102 of switch 103 is adjusted by means of a manually operated knob 115 as shown by dashed construction line 116.

As in the case of switch 42, the movable contacts of switches 63, 74, 88 and 103 have been shown in solid line construction in their "home" positions and dashed line construction in typical operating positions.

Figure 2:
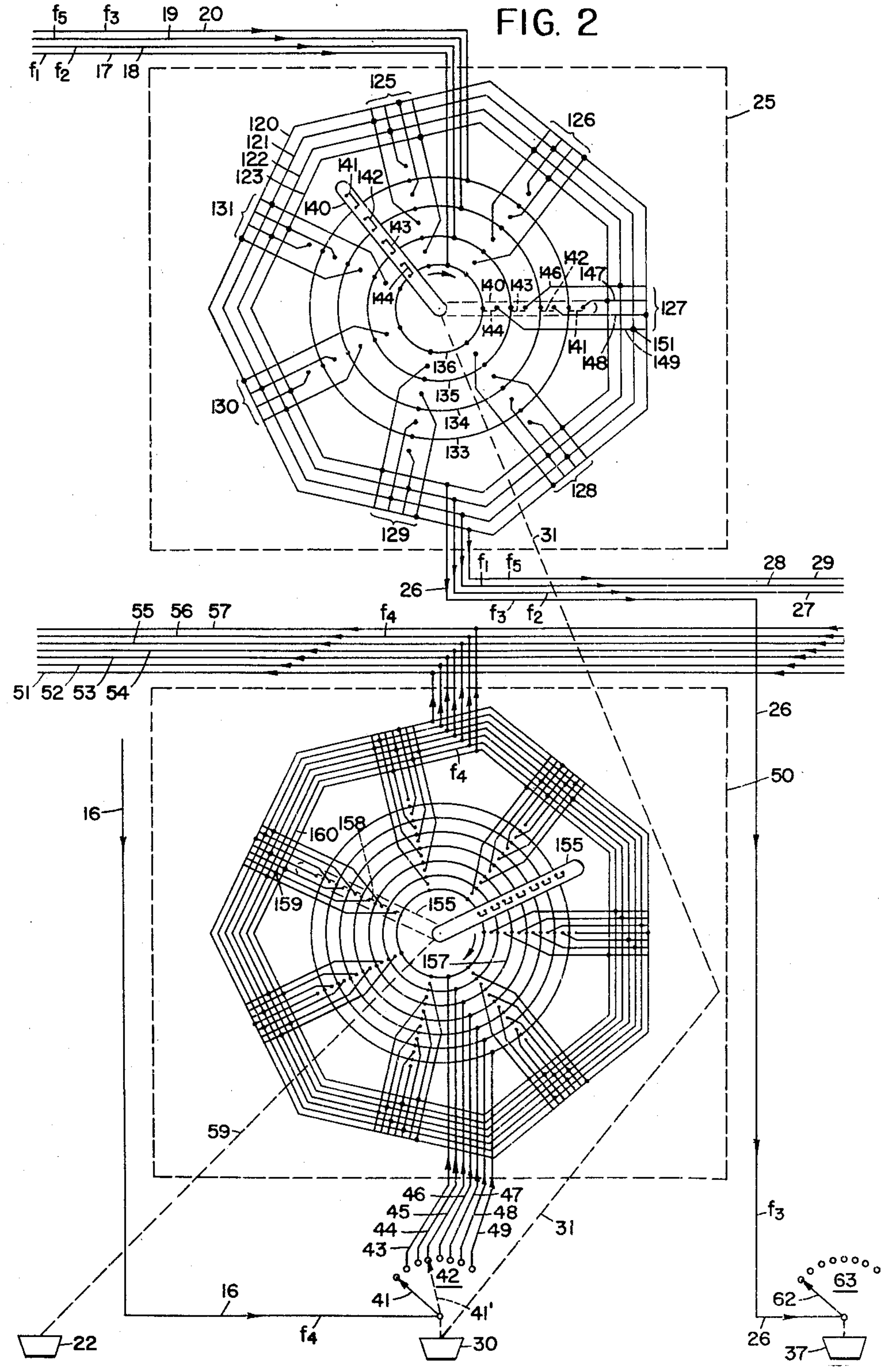
Figure 2 is a detailed schematic illustration of a portion of the apparatus of Figure 1.

Before discussing the detailed illustration of Figure 2, which shows the manner in which a matrix device is selected from a number of such devices and interposed between a series of input circuits and a series of output circuits, it may be advantageous to explain a typical operation of the overall switching apparatus of Figure 1. As described briefly hereinbefore in connection with the Druz disclosure of copending application Serial No. 370,174, the encoding or switching apparatus is required to supply actuating pulses corresponding to signal bursts of different frequencies to different input terminals of a multi-stable actuating device. Accordingly, input circuits 10–14 are connected to the output terminals of a corresponding series of filter and rectifier circuits to segregate the bursts from one another. It will be assumed that five different signal frequencies designated $f_1$–$f_5$ inclusive are employed and that the actuating pulses corresponding to bursts of each frequency appear on an assigned one of input circuits 10–14 as indicated in the drawing. In order for a subscriber to decode a given subscription program, it is necessary to operate knobs 22, 30, 37, 85, 99 and 115 to certain positions or knob settings. For the assumed case, adjustment of knob 22 selects a matrix device in transposition mechanism 15 which connects circuits 10–14 to conductors 16–20 such that the actuating pulses corresponding to the $f_4$ signal bursts (hereinafter termed the $f_4$ pulses) are channeled to conductor 16, $f_1$ pulses to conductor 17, $f_2$ pulses to 18, $f_5$ pulses to 19, and the $f_3$ pulses to conductor 20, as indicated in the drawing. The $f_4$ pulses are therefore channeled to movable contact 41 of switch 42 while the actuating pulses corresponding to bursts of other frequencies are supplied to mechanism 25.

For the illustrated example, it will be assumed that in response to the adjustment of knob 30 a matrix device is selected in mechanism 25 such that input circuit 17 is connected to output circuit 28, conductor 18 is connected to conductor 27, conductor 20 is connected to 26, and conductor 19 is connected to output circuit 29. The $f_3$ pulses are therefore channeled to movable contact 62 of switch 63 while the $f_2$, $f_1$ and $f_5$ pulses are separately translated to mechanism 33. Operation of knob 37 by the subscriber may select a matrix device that connects conductor 28 to conductor 34, 27 to 36, and 29 to 35 in order to supply the $f_1$ pulses to conductor 34, the $f_2$ pulses to conductor 36, and the $f_5$ pulses to conductor 35. Consequently, the $f_1$ pulses are supplied to movable contact 73 of switch 74, the $f_5$ pulses to contact 87 of switch 88, and the $f_2$ pulses are channeled to movable contact 102 of switch 103.

For the assumed case, operation of knobs 30 and 37 may also operate switches 42 and 63 to the positions 41' and 62' shown in dashed outline, while operation of knobs 85, 99 and 115 by the subscriber may adjust switches 74, 88, and 103, respectively, to the positions 73', 87' and 102' illustrated in dashed outline. The $f_4$ pulses from mechanism 15 are therefore supplied over movable contact 41 of switch 42 and conductor 45 to transposition mechanism 50. It will now be assumed that the operation of knob 22 selects a matrix device in mechanism 50 which establishes a connection between conductor 45 and output circuit 56; thus, the $f_4$ pulses appear on output circuit 56 and are translated to the input terminal of the multi-stable actuating device to which conductor 56 is connected.

Similarly, the $f_3$ pulses are channeled to movable contact 62 of switch 63 and thence to conductor 69 and a selected matrix device in mechanism 71. It will be assumed for the illustrated case that operation of knob 30 selects a matrix device in unit 71 which connects conductor 69 to output circuit 54 and consequently all $f_3$ pulses appear on conductor 54.

In like fashion, assume that the adjustment of knob 37 selects a matrix device in mechanism 82 that connects conductor 81 to output circuit 52. The $f_1$ pulses are therefore translated over movable contact 73 of switch 74, conductor 81, and through the selected matrix to output circuit 52.

Assuming now that knob 85 selects a matrix device in mechanism 97 that connects conductor 91 to output circuit 53 and that operation of knob 99 selects a matrix in mechanism 111 that connects conductor 107 to output circuit 57, the $f_5$ pulses are channeled to output circuit 53 and the $f_2$ pulses channeled to output circuit 57. Thus, for the assumed adjustment of the various switches and transposition mechanisms, input circuit 10 is connected to output circuit 52 to translate the $f_1$ pulses thereover, input circuit 11 is connected to output circuit 57 to supply thereto the $f_2$ pulses, input circuit 12 is connected to output circuit 54 to impress the $f_3$ pulses thereon, conductor 13 is connected to conductor 56 to channel the $f_4$ pulses thereto, and conductor 14 is connected to output circuit 53 to translate the $f_5$ pulses thereto.

While in the illustrated example no output circuit is supplied with pulses corresponding to more than one frequency, it should be appreciated that this need not be the case. As explained in the aforementioned Druz application, any number of different frequencies may be routed to each of the input terminals of the multi-stable actuating device.

It will now be explained how a matrix device is selected from a plurality of such devices in a transposition mechanism. In Figure 2, mechanisms 25 and 50 have been shown in complete detail. Of course, all of the other transposition mechanisms may be generally similar thereto. Transposition mechanism 25 comprises a series of four concentric heptagonal conductive strips 120–123 as shown. These conductive strips may take the form of well known etched or printed circuits mounted upon a panel member (not shown) of insulating material. Each of the seven sides or sections of the polygon has four parallel conductive crossbars overlying strips 120–123 and perpendicular thereto to provide seven cross-bar matrix devices 125–131. The cross bars are insulated from strips 120–123, as by being printed on the opposite side of the insulating base, and only selected cross points are connected, by the use of rivets or the like, to provide a variety of interconnection patterns. These cross connections in the matrix devices are indicated by dots in the drawing, and it will be noted that each matrix device may exhibit a different pattern of such connections. It should be apparent that many different permutation patterns may be employed and consequently the patterns of the matrix devices may be different for each subscriber.

Within the heptagonal strips 120–123 of mechanism 25 there is another series of four conductive strips 133–136 arranged in concentric circles. Again, these strips may be printed or etched on the same surface of the insulating common supporting panel (not shown) as strips 120–123. Each of the conductive bars that is perpendicular to conductors 120–123 is connected to a fixed contact, such as a rivet or the like, positioned immediately adjacent but spaced from an assigned one of strips 133–136, as shown. Intermediate fixed contacts are electrically connected to conductive strips 133–136 respectively.

A rotating member or contact arm 140, constructed of insulating material, is rotatably mounted on the center of the printed circuit arrangement under the control of knob 30 and includes four electrical jumpers 141–144 extending between fixed contacts adapted to engage adjacent pairs of the fixed contacts of each matrix device. Arm 140 is shown in solid line construction in its "home" or reference operating position in which jumpers 141–144 are ineffective to establish any circuit connections, whereas it is shown in dashed outline in one of its operating positions, specifically, the operating position which renders matrix device 127 effective to establish the described circuit interconnections between conductors 17–20 and 26–29 in the example discussed hereinbefore in connection with Figure 1. In the alternate dashed line position of rotator 140, jumpers 141–144 electrically connect the four cross bars of matrix device 127 to assigned ones of conductive strips 133–136. More particularly, bar 146 of matrix device 127 is connected over jumper 143 to strip 135, bar 147 is connected over jumper 141 to strip 133, bar 148 over jumper 142 to conductive strip 134, and conductive bar 149 is connected by means of jumper 144 to conductive strip 136.

Input circuit 17 from transposition mechanism 15 is connected to conductive strip 136, input circuit 18 is connected to strip 135, conductor 19 to conductive strip 134, and input circuit 20 from mechanism 15 is connected to conductive strip 133. Strip 123 is connected to output circuit 26, conductive strip 122 is connected to output circuit 27, strip 121 to conductor 28, and strip 120 is connected to output conductor 29. Since the adjustment of rotatable arm 140 by the subscriber to one of its operating positions connects the strips 120–123 to strips 133–136 in a unique pattern as determined by the particular cross connections of the matrix device corresponding to the selected position of arm 140, and since input circuits 17–20 are connected to strips 133–136 and strips 120–123 are connected to output conductors 26–29, it is apparent that merely selecting a different one of the matrix devices 125–131 effects a different pattern of connections between the input circuits 17–20 and the output circuits 26–29.

For example, in the assumed case discussed hereinbefore, the $f_1$ pulses translated over input circuit 17 are channeled through mechanism 25 to output circuit 28. Such a connection is completed over the following path in Figure 2: input circuit 17, conductive strip 136, jumper 144 of arm 140, cross bar 149 of matrix device 127, cross connection 151, strip 121, and thence to output circuit 28. The other input circuits 18–20 may be similarly traced through the cross connections of matrix 127. Of course, in the illustrated embodiment there are only seven different matrix devices having four predetermined cross connection patterns each, but it is obvious that many more devices may be employed in any switching arrangement and, moreover, each matrix device may be provided with any desired number of alternative permutation patterns.

Mechanism 50 in Figure 2 is very similar to mechanism 25 with the exception that it is expanded to accommodate the seven input circuits 43–49 and the seven output circuits 51–57. To this end, seven concentric heptagonal conductive strips and seven concentrically arranged circular conductive strips are employed, in conjunction with seven cross bars in each matrix device. A rotatable contact arm 155, which is shown in its "home" or reference position in solid line construction and in a typical operating position in dashed outline, has seven jumpers. The operating position illustrated in dash outline is such that the circuit interconnection established by mechanism 50 in the previously described example is realized. Specifically, it has been stated before that when knob 30 positions movable contact 41 to the position shown in dashed outline and when knob 22 adjusts mechanism 50 in the described manner, conductor 16 which carries the $f_4$ pulses is connected to output circuit 56. This is achieved in Figure 2 over the following path: conductor 16, movable contact 41 of switch 42, input conductor 45, strip 157, jumper 158 of contact arm 155, cross connection 159, strip 160, to output circuit 56.

Of course, it should be realized that it is not essential that switch 42 have the same number of operating positions as the number of output circuits 51–57. In the described embodiment this has been the case for convenience of illustration, but switch 42 may have, for example, eight operating positions. If such is the case, there would then be eight rather than seven input circuits to be connected through a selected matrix device to the seven output circuits. Consequently, each matrix device would have a different number of bars in one direction than in the other, specifically, eight cross bars would be employed, and at least one of the output circuits would be connected to two of such bars.

As a variant of the invention, the output conductors of each of the transposition mechanisms 50, 71, 82 and 97 are connected to the input terminals of another transposition mechanism rather than directly to output circuits 51–57. In the specific arrangement of Figure 3, adjacent transposition mechanisms are interconnected in this manner, and an additional transposition mechanism 170 under the control of knob 22 is provided between mehanism 50 and output circuits 51–57. In this manner, the stationary contacts of switches 63, 74, 88 and 103 are connected to output circuits 51–57 through two or more transposition mechanisms connected in cascade. This further enhances the security of the arrangement since each adjustment of knobs 30, 37, 85 and 99 simultaneously affects the transposition of the pulses appearing at a plurality of switches. Additionally, the control effect of the various knobs is somewhat different from that of the embodiment of Figure 1. Specifically, knob 22 adjusts transposition mechanism 170, which has no counterpart in Figure 1, in addition to transposition mechanism 15. Knob 30 selects a matrix device from mechanism 50 and one from mechanism 25 simultaneously, knob 37 adjusts mechanisms 71 and 33 simultaneously and knobs 85 and 99 select matrix devices in mechanisms 82 and 97, respectively. Knob 115 in the embodiment of Figure 3 merely adjusts the positioning of switch 103. In all other respects, the Figure 3 embodiment is identical to that of Figure 1.

Figure 3:
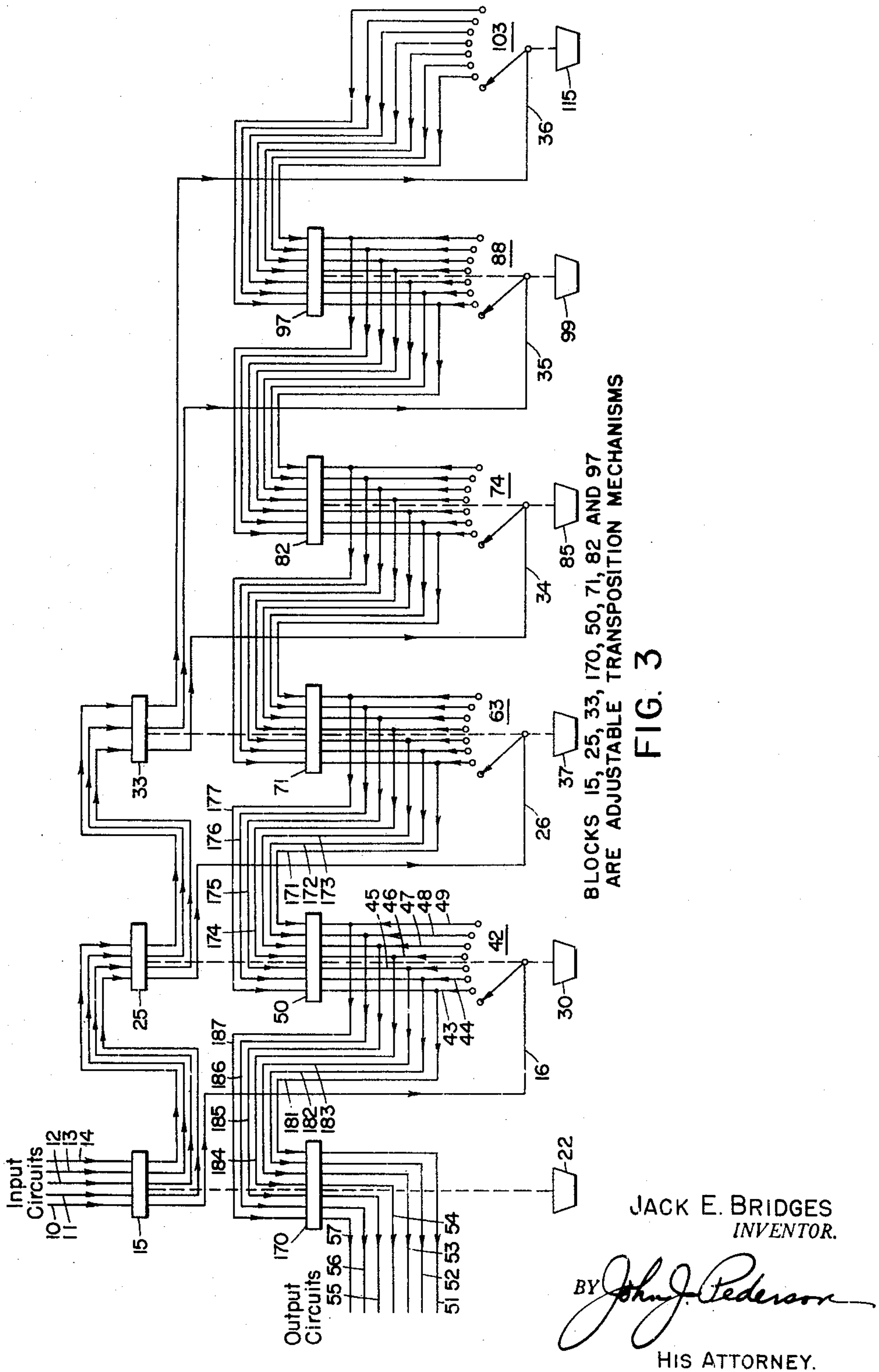
Figure 3 is a schematic diagram of an encoding apparatus constructed in accordance with another embodiment of the invention; and, Figure 4 is a detailed schematic drawing of a portion of the apparatus of Figure 3.

In the arrangement of Figure 3, the pulses appearing on, for example, conductor 36, are channeled through switch 103 and thence through transposition mechanisms 97, 82, 71, 50, and 170 all connected in series or cascade to a selected one of output circuits 51–57. Thus, the adjustment of each one of the knobs varies the channeling of these particular actuating pulses. Similarly, the pulses applied to conductor 35 are channeled through switch 88 and thence through selected matrix devices in mechanisms 82, 71, 50 and 170 in series to a selected output circuit. The actuating pulses supplied to conductor 34 are channeled through switch 74 and mechanisms 71, 50 and 170; the pulses on conductor 26 are supplied through switch 63 and mechanisms 50 and 170, while the actuating pulses applied to conductor 16 are translated only through switch 42 and mechanism 170.

Figure 4:
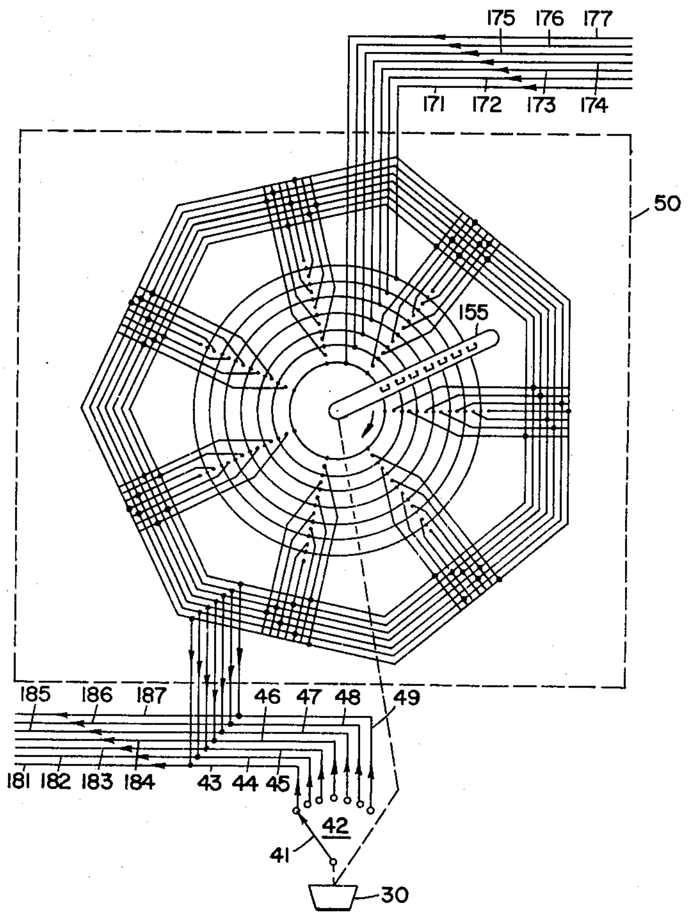

The manner in which the transposition mechanisms are connected in Figure 3 is shown by the detailed representation of Figure 4. It will be noted that the construction of mechanism 50 in Figure 4 is identical to that of mechanism 50 in Figure 2. The only difference is that the input circuits 171–177 connected to the circular conductive strips are connected to the output of mechanism 71 and also to the stationary contacts of switch 63 rather than to the stationary contacts of switch 42, as is the case in Figures 1 and 2. The output conductors connected to the heptagonal conductive strips in Figure 4 are connected over conductors 181–187, along with conductors 43–49, to the input of transposition mechanism 170 in the same manner as input circuits 171–177 are connected to the input of mechanism 50.

By way of summary, the encoding apparatus of the invention comprises a series of N input circuits such as the four input circuits 17–20 in Figure 2, and a series of M output circuits such as the four output circuits 26–29. A plurality of matrix devices 125–131 are provided and individually have a series of N or four input terminals connected to a series of M or four output terminals (by means of the cross connections) in accordance with a unique input-output permutation pattern. Switching means (rotatable contact arm 140, jumpers 141–144, knob 30, and conductive strips 133–136) having a plurality of operating conditions selectively couples input circuits 17–20, through a different one of matrix devices 125–131 for each of the operating conditions, to output circuits 26–29 in accordance with the permutation pattern of the selected matrix device.

While particular embodiments of the invention have been shown and described, modifications may be made, and it is intended in the appended claims to cover all such modifications as may fall within the true spirit and scope of the invention.

I claim:

1. Decoding apparatus for a subscription television receiver comprising: a series of primary input circuits; a series of secondary input circuits; a first adjustable transposition mechanism having a plurality of operating conditions for connecting said primary input circuits to said secondary input circuits in accordance with a different transposition pattern for each such operating condition; a multi-position switch having a movable contact and a plurality of stationary contacts; means connecting an assigned one of said secondary input circuits to the movable contact of said multi-position switch; a series of primary output circuits each of which is connected to an assigned one of the stationary contacts of said switch; a series of secondary output circuits; and a second adjustable transposition mechanism having a plurality of operating conditions for connecting said primary output circuits to said secondary output circuits in accordance with a different transposition pattern for each such operating condition.

2. Decoding apparatus for a subscription television receiver comprising: a series of primary input circuits; a series of secondary input circuits; a first adjustable transposition mechanism having a plurality of operating conditions for connecting said primary input circuits to said secondary input circuits in accordance with a different transposition pattern for each such operating condition; a multi-position switch having a movable contact and a plurality of stationary contacts; means connecting an assigned one of said secondary input circuits to the movable contact of said multi-position switch; a series of primary output circuits each of which is connected to an assigned one of the stationary contacts of said switch; a series of secondary output circuits; a second adjustable transposition mechanism having a plurality of operating conditions for connecting said primary output circuits to said secondary output circuits in accordance with a different transposition pattern for each such operating condition; and uni-control means for simultaneously adjusting said first and second transposition mechanisms between said operating conditions.

3. Decoding apparatus for a subscription television receiver comprising: a series of primary input circuits; a series of secondary input circuits; a plurality of input matrix devices individually having a series of input terminals connected to a series of output terminals in accordance with a unique input-output permutation pattern; first switching means having a plurality of operating conditions for selectively coupling said primary input circuits, through a different one of said input matrix devices for each such operating condition, to said secondary input circuits in accordance with the permutation pattern of the selected input matrix device; a multi-position switch having a movable contact and a plurality of stationary contacts; means connecting an assigned one of said secondary input circuits to the movable contact of said multi-position switch; a series of primary output circuits individually connected to an assigned one of the stationary contacts of said switch; a series of secondary output circuits; a plurality of output matrix devices individually having a series of input terminals connected to a series of output terminals in accordance with a unique input-output permutation pattern; and second switching means having a plurality of operating conditions for selectively coupling said primary output circuits, through a different one of said output matrix devices for each such operating condition, to said secondary output circuits in accordance with the permutation pattern of the selected output matrix device.

4. Decoding apparatus for a subscription television receiver comprising: a series of primary input circuits; a series of secondary input circuits; a plurality of input matrix devices individually having a series of input terminals connected to a series of output terminals in accordance with a unique input-output permutation pattern; switching means having a plurality of operating conditions for selectively coupling said primary input circuits, through a different one of said input matrix devices for each such operating condition, to said secondary input circuits in accordance with the permutation pattern of the selected input matrix device; a series of multi-position switches each having a movable contact and a plurality of stationary contacts; means connecting each of said secondary input circuits to the movable contact of an assigned one of said multi-position switches; a series of groups of primary output circuits each group connected to the stationary contacts of an assigned one of said multi-position switches; a series of secondary output circuits; a series of groups of output matrix devices each device having a series of input terminals connected to a series of output terminals in accordance with a unique input-output permutation pattern; and a series of multi-position switching mechanisms each having a plurality of operating conditions and each coupling an assigned one of the groups of primary output circuits, through a different one of the output matrix devices of an assigned group for each such operating condition, to said secondary output circuits in accordance with the permutation pattern of the selected output matrix device.

5. Decoding apparatus for a subscription television receiver comprising: a series of primary input circuits; a series of secondary input circuits; a plurality of groups of input matrix devices each device having a series of input terminals connected to a series of output terminals in accordance with a unique input-output permutation pattern; means including a corresponding plurality of first multi-position switching mechanisms individually associated with one of said groups of input matrix devices and each having a plurality of operating conditions for coupling said primary input circuits to said secondary input circuits through a selected input matrix device from each of the groups in cascade in accordance with the combined permutation patterns of the selected input matrix devices, the selected input matrix device from each group being different for each operating condition of the associated multi-position switching mechanism; a series of multi-position switches each having a movable contact and a plurality of stationary contacts; means connecting each of said secondary input circuits to the movable contact of an assigned one of said multi-position switches; a series of groups of primary output circuits each group connected to the stationary contacts of an assigned one of said multi-position switches; a series of secondary output circuits; a series of groups of output matrix devices each device having a series of input terminals connected to a series of output terminals in accordance with a unique input-output permutation pattern; and a series of second multi-position switching mechanisms each coupling an assigned one of the groups of primary output circuits through a selected one of the output matrix devices of an assigned group to said secondary output circuits in accordance with the permutation pattern of the selected output matrix device.

6. Decoding apparatus for a subscription television receiver comprising: a series of primary input circuits; a series of secondary input circuits; a plurality of groups of input matrix devices each device having a series of input terminals connected to a series of output terminals in accordance with a unique input-output permutation pattern; means including a corresponding plurality of first multi-position switching mechanisms individually associated with one of said groups of input matrix devices and each having a plurality of operating conditions for coupling said primary input circuits to said secondary input circuits through a selected input matrix device from each of the groups in cascade in accordance with the combined permutation patterns of the selected input matrix devices, the selected input matrix device from each group being different for each operating condition of the associated multi-position switching mechanism; a series of multi-position switches each having a movable contact and a plurality of stationary contacts; means connecting each of said secondary input circuits to the movable contact of an assigned one of said multi-position switches; a series of groups of primary output circuits each group connected to the stationary contacts of an assigned one of said multi-position switches; a series of secondary output circuits; a series of groups of output matrix devices each device having a series of input terminals connected to a series of output terminals in accordance with a unique input-output permutation pattern; a series of second multi-position switching mechanisms each coupling an assigned one of the groups of primary output circuits through a selected one of the output matrix devices of an assigned group to said secondary output circuits in accordance with the permutation pattern of the selected output matrix device; and uni-control means for simultaneously adjusting an assigned one of said first switching mechanisms, an assigned one of said multi-position switches, and an assigned one of said second switching mechanisms.

7. Decoding apparatus for a subscription television receiver comprising: a series of primary input circuits; a series of secondary input circuits; a plurality of input matrix devices individually having a series of input terminals connected to a series of output terminals in accordance with a unique input-output permutation pattern; switching means having a plurality of operating conditions for selectively coupling said primary input circuits, through a different one of said input matrix devices for each of the operating conditions, to said secondary input circuits in accordance with the permutation pattern of the selected input matrix device; a series of multi-position switches each having a movable contact and a plurality of stationary contacts; means connecting each of said secondary input circuits to the movable contact of an assigned one of said multi-position switches; a series of groups of primary output circuits each group connected to the stationary contacts of an assigned one of said multi-position switches; a series of secondary output circuits; a series of groups of output matrix devices each device having a series of input terminals connected to a series of output terminals in accordance with a unique input-output permutation pattern; and means including a series of multi-position switching mechanisms individually associated with one of said groups of output matrix devices and each having a plurality of operating conditions for coupling an assigned one of the groups of primary output circuits to said secondary output circuits through a selected output matrix device from each of the groups in cascade in accordance with the combined permutation patterns of the selected output matrix devices, the selected output matrix device from each group being different for each operating condition of the associated multi-position switching mechanism.

8. Decoding apparatus for a subscription television receiver comprising: a series of primary input circuits; a series of secondary input circuits; a plurality of groups of input matrix devices each device having a series of input terminals connected to a series of output terminals in accordance with a unique input-output permutation pattern pattern; means including a corresponding plurality of first multi-position switching mechanisms individually associated wth one of said groups of input matrix devices and each having a plurality of operating conditions for coupling said primary input circuits to said secondary input circuits through a selected input matrix device from each of the groups in cascade in accordance with the combined permutation patterns of the selected input matrix devices, the selected input matrix device from each group being different for each operating condition of the associated first multi-position switching mechanism; a series of multi-position switches each having a movable contact and a plurality of stationary contacts; means connecting each of said secondary input circuits to the movable contact of an assigned one of said multi-position switches; a series of groups of primary output circuits each group connected to the stationary contacts of an assigned one of said multi-position switches; a series of secondary output circuits; a series of groups of output matrix devices each device having a series of input terminals connected to a series of output terminals in accordance with a unique input-output permutation pattern; means including a series of second multi-position switching mechanisms individually associated with one of said groups of output matrix devices and each having a plurality of operating conditions for coupling an assigned one of the groups of primary output circuits to said secondary output circuits through a selected output matrix device from each of the groups in cascade in accordance with the combined permutation patterns of the selected output matrix devices, the selected output matrix device from each group being different for each operating condition of the associated second multi-position switching mechanism; and uni-control means for simultaneously adjusting an assigned one of said first switching mechanisms, an assigned one of said multi-position switches, and an assigned one of said second switching mechanisms.

9. In a subscription television receiver, a secrecy apparatus comprising: a series of input circuits; a series of output circuits; a plurality of cascade-connected adjustable transposition mechanisms individually including a plurality of matrix devices, each such matrix device having a series of input terminals connected to a series of output terminals in accordance with a unique input-output permutation pattern; and means connecting said input circuits to said output circuits through respective selected matrix devices of said transposition mechanisms in cascade.

10. In a subscription television receiver, a secrecy apparatus comprising: a series of N input circuits, where N is an integer greater than 2; a series of M output circuits, where M is an integer greater than 2; a plurality of cascade-connected adjustable transposition mechanisms individually including a plurality of matrix devices having a series of N input terminals connected to a series of M output terminals in accordance with a unique input-output permutation pattern; and switching means for coupling said input circuits through selected matrix devices of said transposition mechanisms, in cascade, to said output circuits in accordance with the combined permutation patterns of the selected matrix devices.

11. In a subscription television receiver, a secrecy apparatus comprising: a series of N input circuits, where N is an integer greater than 2; a series of M output circuits, where M is equal to N; a plurality of cascade-connected adjustable transposition mechanisms individually including a plurality of matrix devices each having a series of N input terminals connected to a series of M output terminals in accordance with a unique input-output permutation pattern; and switching means for coupling said input circuits through selected matrix devices of said transposition mechanisms, in cascade, to said output circuits in accordance with the combined permutation patterns of the selected matrix devices.

12. In a subscription television receiver, a secrecy apparatus comprising: a series of N input circuits, where N is an integer greater than 2; a series of M output circuits, where M is an integer greater than 2; a plurality of cascade-connected adjustable transposition mechanisms individually including a plurality of matrix devices each having a series of N input terminals connected to a series of M output terminals in accordance with a unique input-output permutation pattern; and switching means for effectively interposing a selected one of said matrix devices from each of said transposition mechanisms between said input and output circuits to couple said input circuits to said output circuits in accordance with the combined permutation patterns of the selected matrix devices.

13. In a subscription television receiver, a secrecy apparatus comprising: a series of N input circuits, where N is an integer greater than 2; a series of M output circuits, where M is an integer greater than 2; a plurality of cascade-connected adjustable transposition mechanisms individually including a plurality of cross-bar matrix devices each including a series of N input terminals connected to respective ones of a corresponding series of N conductive input bars, a series of M output terminals connected to respective ones of a corresponding series of M conductive output bars, and electrical interconnections between said input and output bars in accordance with a unique permutation pattern; and switching means for coupling said input circuits through selected cross-bar matrix devices to said output circuits in accordance with the combined permutation patterns of the selected matrix devices.

14. In a subscription television receiver, a secrecy apparatus comprising: a series of input circuits; a series of output circuits; a plurality of cascade-connected adjustable transposition mechanisms individually including a plurality of devices each representing a unique permutation pattern; and switching means for selecting any desired one of said devices at will from each of said transposition mechanisms and for utilizing the selected devices in cascade to intercouple said input circuits with said output circuits in accordance with the combined permutation patterns represented by the selected devices.

15. In a subscription television receiver, a secrecy apparatus comprising: a series of input circuits; a series of output circuits; a plurality of cascade-connected adjustable transposition mechanisms individually including a plurality of similar devices each having a predetermined characteristic different from that of each of the remaining devices to represent a unique permutation pattern; and switching means for selecting a desired one of said devices at will from each of said transposition mechanisms and for utilizing the selected devices in cascade to intercouple said input circuits with said output circuits in accordance with the combined permutation patterns represented by the selected devices.

References Cited in the file of this patent

UNITED STATES PATENTS

| | | |
|---|---|---|
| 1,953,829 | Morris | Apr. 3, 1934 |
| 1,972,289 | Chauveau | Sept. 4, 1934 |
| 2,403,280 | Hicks | July 2, 1946 |
| 2,405,570 | Dehn | Aug. 13, 1946 |
| 2,517,587 | Mohr | Aug. 8, 1950 |